Figure 4:
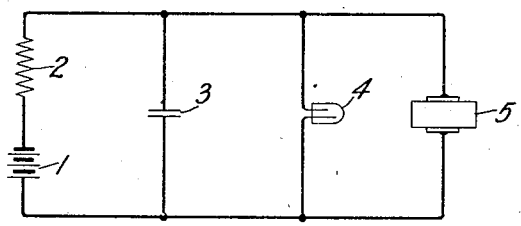

Oct. 10, 1933.  W. A. MARRISON  1,930,278
OSCILLATION GENERATOR
Filed May 11, 1928  2 Sheets-Sheet 1
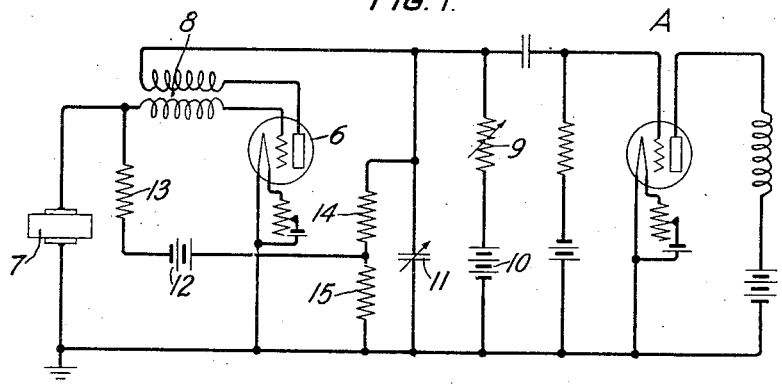
INVENTOR
WARREN A. MARRISON
BY J. P. Neville
ATTORNEY Oct. 10, 1933.  W. A. MARRISON  1,930,278
OSCILLATION GENERATOR
Filed May 11, 1928  2 Sheets-Sheet 2

INVENTOR
WARREN A. MARRISON
BY J. P. Neville
ATTORNEY

Patented Oct. 10, 1933

1,930,278

UNITED STATES PATENT OFFICE 1,930,278

OSCILLATION GENERATOR

Warren A. Marrison, Orange, N. J., assignor to Bell Telephone Laboratories, Incorporated, New York, N. Y., a corporation of New York Application May 11, 1928. Serial No. 277,018

8 Claims. (Cl. 250—36)

This invention relates to sub-harmonic frequency producers or frequency dividers and has for an object to increase the stability of operation of such apparatus.

A portion of the subject matter disclosed but not claimed herein is being claimed in divisional application, Serial No. 382,306, filed July 31, 1929.

For many purposes, it is desirable to produce a wave the frequency of which is a known fraction of the frequency of a given wave. One of the most satisfactory types of standard frequency generators is a piezo-electric controlled oscillator, but this can only be operated at comparatively high frequencies. When a standard low frequency is desired, it is necessary either to use a more or less variable frequency source provided with means to stabilize its operation or to employ a standard high frequency generator associated with some system for stepping down the frequency of the wave produced thereby.

In a copending application, Serial No. 214,433, filed August 20, 1927, Patent No. 1,733,614, granted October 29, 1929, by applicant, there is described a system including an electric discharge device for producing a sub-harmonic of a high frequency wave impressed upon the input circuit of the discharge device. The plate circuit of the discharge device includes a condenser arranged to be charged through a resistance, which determines the rate at which the condenser is charged. The grid is negatively biased with respect to the filament so that normally no plate current will flow and this bias is opposed by a positive grid potential proportional to the charging current supplied to the condenser. As a charge accumulates on the condenser a point is reached where this charge plus a positive peak of the applied high frequency wave overcomes the negative grid bias and the space current path becomes conductive, thus permitting the condenser to discharge through the plate circuit, which includes a feed back connection to the grid circuit. As the flow of current from the feed back path increases the grid is made more positive with respect to the filament. The plate current rises to a maximum value and the condenser charge is rapidly dissipated. The grid then remains negative with respect to the filament until the condenser charge builds up sufficiently for its charge plus another positve peak of the applied high frequency wave to start another discharge. By properly selecting the capacity of the condenser and adjusting the negative potential applied to the grid, it is possible to cause the condenser to discharge once for any given number of cycles of the applied high frequency wave thereby to produce an output wave, the frequency of which is a desired sub-multiple of the frequency of the applied high frequency wave. Such a circuit is very stable and operates to produce an output wave the frequency of which may be controlled to have an exact ratio with respect to the input wave without using a highly critical adjustment of the constants of the circuit elements.

In accordance with the present invention, the same principle is utilized, but instead of using a separate source to apply a high frequency potential to the grid of the discharge device, its input and output circuits are coupled in feed back relation to generate oscillations and a piezo-electric crystal, preferably of quartz is included in the grid circuit.

When the system is operating and the charge on the condenser plus a positive peak of a wave of the crystal frequency causes the condenser to discharge, there is fed back to the input circuit an impulse including a component of the crystal frequency which shock-excites the crystal and maintains the crystal vibrations.

As in the system of the above mentioned application, by properly selecting the value of the condenser and adjusting the negative potential applied to the grid, it is possible to cause the condenser to discharge once for any given number of cycles of the crystal frequency. There is thereby produced an output wave having a frequency which is a desired submultiple of the crystal frequency.

In another embodiment of the invention, a two element gas filled tube is connected in parallel with a piezo-electric crystal and a condenser, which is charged by a battery through a resistance. At a certain value of charge on the condenser, the tube breaks down and the condenser quickly discharges through the tube. This excites the crystal which begins to vibrate at its natural frequency thus impressing an alternating potential across the tube. The charge on the condenser falls to a low value and the discharge through the tube stops until the charge is again built up to the breakdown point of the tube. At some positive peak value of the voltage wave due to the vibration of the crystal plus the charge on the condenser, the tube will again break down, and the condenser will again be discharged through the tube. By properly selecting the value of capacity and resistance in the circuit, this device may be caused to operate at any desired sub-multiple of the crystal frequency over a considerable range.

In the drawings, Figs. 1 and 2 are circuit diagrams of two forms of the invention.

Fig. 3 comprises curves illustrating graphically the operation of the circuit of Figs. 1 and 2.

Fig. 4 is a diagram of a different circuit involving the invention.

Figure 5:
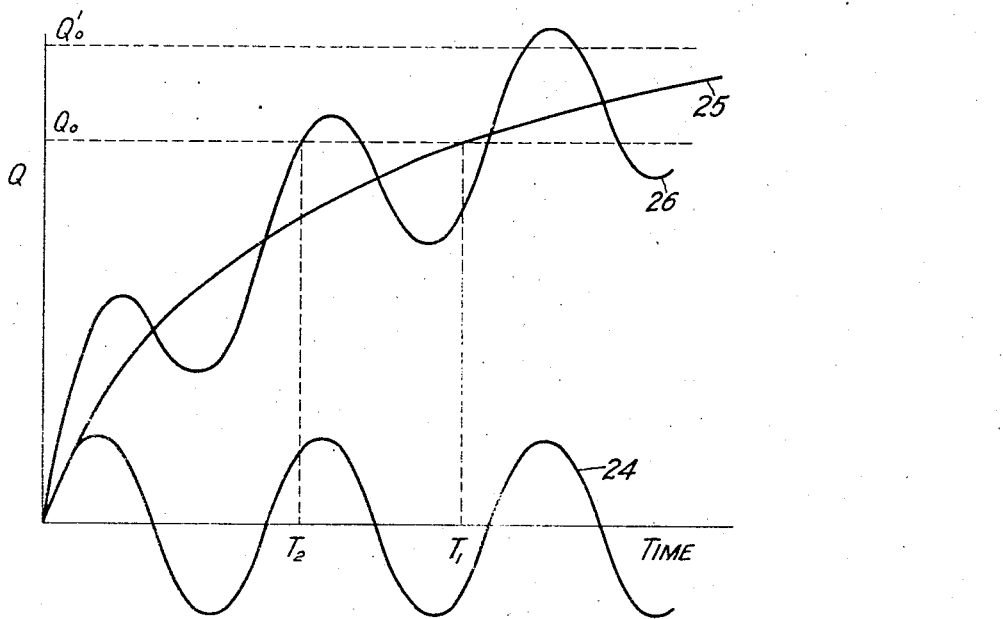

Fig. 5 comprises curves illustrating graphically the operation of the circuit of Fig. 4.

Referring to Fig. 1 there is shown a three electrode discharge device 6 which has a piezo-electric crystal 7 in its grid filament circuit. In the space current circuit of the device 6 is the primary of a feed back transformer 8, the secondary of which is in the grid filament circuit thereof, and in series with said primary in the space current circuit is the variable resistance 9 and battery 10.

A variable condenser 11 is connected in parallel with said battery 10 and resistance 9 across the plate and filament of said discharge device.

A battery 12 is connected in the grid circuit in series with a resistance 13 to render the grid normally so negative with respect to the cathode that space current does not flow through the device 6.

The positive terminal of the battery 12 is connected to the junction of two high resistance elements 14 and 15 which are connected in series across the condenser 11. These resistances constitute a potentiometer which applies to the grid of the device a positive potential opposed to the potential of the battery 12 and which is proportional to the charge upon the condenser 11. This apparatus constitutes a sub-harmonic oscillator to which is coupled by resistance the amplifier A.

The operation of the circuit of Fig. 1 can best be described by reference to the curves of Fig. 3.

For the purpose of this description it is assumed that the crystal is vibrating at its natural frequency.

Curve 27 is a portion of the grid voltage-plate current characteristic of the device 6 of Fig. 1. The potential applied to the grid from the battery 12 is of such a negative value that the grid normally operates at the point A, about which the potential is varied by the voltage wave due to the vibrations of the piezo-electric device 7, as indicated by the curve 31.

As the charge on the condenser 11 builds up, the grid potential becomes less negative due to the positive potential impressed thereon by the potentiometer 14—15. The effect of this varying potential is represented by curves 29.

The charge on the condenser continues to build up to increase the positive potential applied to the grid by the potentiometer 14—15, until it finally reaches a value such that the negative potential applied by the battery 12 is overcome and space current begins to flow through the tube. Due to the action of transformer 8 this causes the grid to become more positive, which in turn allows more current to flow, resulting in the discharge of the condenser in a surge of current through the space current path of the character indicated by curves 34. After this occurs the grid again becomes negative with respect to the filament, due to potential applied by the battery 12 which is no longer opposed by the charge on the condenser 11, and the space current ceases to flow through the device 6.

As the charge on the piezo-electric device 7 is proportional to the charge on the grid, the surge of positive potential causes shock excitation of the crystal, which is thereby set into vibration at its natural frequency. Alternate positive and negative charges are thereby produced upon its electrodes, and are impressed on the grid of the space discharge tube 6. This potential is represented by curve 31 of Fig. 3.

The combined effect of the charge on the condenser and the voltage developed by crsytal oscillations is shown by curve 30 of Fig. 3. As indicated by the nearly horizontal portion of curve 30, the positive potential on the grid is as abruptly dissipated, to apply a sharp impulse to shock-excite the crystal. The various elements are in the condition originally assumed and the system continues to operate to repeat the cycle described above.

The negative bias will always be overcome and the condenser discharged, causing plate current to flow, at a positive peak of crystal potential, once for a given number of cycles of wave controlled by the crystal. The amplifying tube A will therefore have impressed upon its input electrodes a wave of a frequency which is a sub-harmonic of the crystal frequency. The value of the sub-harmonic may be made any desired sub-multiple of the crystal frequency, within limits, by selecting suitable values of the condenser 11 and the resistance 9.

In Fig. 2 is shown a space discharge oscillator O of the type disclosed in U. S. Patent No. 1,472,470, October 30, 1923 to Hartley, in which a piezo-electric crystal has been inserted in the grid circuit.

The tuned frequency-determining circuit of the oscillator comprises a condenser in parallel with an inductance L. Coupled to the inductance L is the inductance 16 of a sub-harmonic oscillator such as described in connection with Fig. 1. Inductance 16 has a feed back inductance 17 coupled thereto, and in series with 16 is a battery 18.

A battery 19 is connected in series with a resistance 20, in the plate circuit, across a variable capacity 21, which cooperates with the resistance elements 22 and 23 to apply a positive potential to the grid in opposition to the negative potential of the battery 18.

The apparatus shown in Fig. 2 operates on the same principle as that shown in Fig. 1, except that space discharge tube 33 and its associated apparatus constitute a crystal controlled oscillator O, while the space discharge tube 32 and its associated circuits constitute a sub-harmonic generator of the type disclosed in Fig. 1, having the output wave produced by the oscillator impressed on its grid through the inductively coupled coils L and 16. The battery 19 charges condenser 21 through resistance 20, and this charge is applied to the grid through potentiometer 22—23 in oppositon to battery 18, which normally precludes the flow of space current. At some positive peak of input potential wave from the crystal controlled oscillator the condenser will discharge.

As described above, by properly selecting the constants of the control elements included in the circuits of tube 32 the charge and discharge of the condenser can be regulated to cause the production of a wave, the frequency of which is a desired sub-harmonic of the crystal frequency.

It is possible to control oscillations in much the same way as outlined above by means of a two-element tube which becomes conductive where a definite voltage is impressed across its electrodes. An arrangement of this character is illustrated in Fig. 4, in which is shown a battery 1 in series with a resistance 2 through which a charging current is supplied to a condenser 3. In parallel with the condenser 3 is a two-electrode gas filled tube 4, and a piezo-electric device 5. The operation of this device may be explained by reference to the curves of Fig. 5. When the charge on the condenser reaches a certain value, the gas filled two element tube becomes conductive and current begins to flow, and at the same time the resistance of the tube falls so that current flows faster than it can be supplied through resistance 2. The charge on the condenser is dissipated and falls to a low value and the discharge through the tube stops until the charge on the condenser is again sufficient to overcome the reluctance of the tube, to cause a current discharge between its electrodes.

When the condenser discharges, the crystal element 5 in set in vibration and alternate positive and negative charges appear on its electrodes which continue after the flow of current through the tube 4 has stopped and while the condenser 3 is again being charged.

A normal charging curve of the condenser is shown at 25 in Fig. 5 and the potential due to the vibration of the crystal is illustrated by curve 24. It will be apparent that the combined charge on the condenser, due to the battery and the wave of crystal frequency, will be that indicated by curve 26. Suppose now the two electrode tube breaks down when the condenser is charged to $Q_0$, Fig. 5. If the piezo-electric crystal is not acting this will occur in time $T_1$, but if the crystal is vibrating the tube breakdown will occur at time $T_2$. The charge is triggered off by one of the positive peaks of the component of the voltage due to the vibrations of the crystal. In the example illustrated, this occurs at the second peak from zero time. In this case the frequency of the condenser discharge is half the resonant frequency of the crystal. If the voltage at which the two element tube breaks down is $Q'_0$ the frequency of condenser discharge would be ⅓ that of the crystal frequency. By varying the values of capacity and resistance the time at which tube breakdown occurs can be extended in either direction, within limits, depending on the characteristics of the two element tube. By varying the characteristics of the tube, or the values of the capacity and resistance, the apparatus may be controlled to produce a wave having a desired sub-harmonic frequency relation to the natural frequency of the crystal.

The piezo-electric crystal resonator is kept in vibration by synchronous shock excitation. Each time the condenser is discharged the crystal receives a shock, a component of which is in the correct phase relation to the motion of the crystal to sustain its vibration.

It will, of course, be apparent that this invention is capable of various embodiments and applications other than those specifically referred to or described herein. For example, if it is desired to obtain a frequency, say one-sixth of that of the controlling crystal, it is not necessary to do it in one step, but greater stability might be attained by using two steps of one-half and one-third, respectively.

What is claimed is:

1. In combination, a piezo-electric crystal, an electric discharge device and a source of electrical energy, said device being connected to both said crystal and said source whereby the potential to which said device is subjected and which determines its discharge is a resultant of the electromotive forces impressed upon it by said source and by said crystal.

2. A source of electrical energy, an electric discharge device having a discharge path connected in series with said source, a piezo-electric element connected to said source to receive a charge therefrom and also connected to said device to discharge therethrough, and means to cause the discharge of current by said device to set said crystal into oscillation and to impress the oscillation electromotive forces developed by said crystal upon said discharge device whereby the periodicity of discharge of said device is determined jointly by the circuit of said source and by the natural frequency of said element.

3. In combination a source of electrical energy, an electric discharge device connected thereto and adapted to permit current to discharge therethrough when the applied voltage reaches a critical value, means for regulating the rate at which the terminal voltage upon said device is built up from said source, a piezo-electric element maintained in mechanical and electrical oscillation, and means whereby said piezo-electric element causes said discharge device to pass current by applying an electromotive force thereto to conspire with that applied by said source.

4. A source of electrical energy, an electric discharge device connected in energy flow relation therewith and a piezo-electric element connected to said discharge device whereby when said discharge device discharges current it excites said piezo-electric element which in turn applies oscillating electromotive forces to said device, and means for limiting the rate at which said source builds up a potential across the discharge path of said device to such an extent that discharges take place at a lower periodicity than that of the oscillating electromotive force developed by said excited piezo-electric element.

5. In combination an electric discharge device, a source of electrical energy connected thereto by a path which permits the electromotive force applied to said device to exceed its breakdown potential so as to cause a discharge, a piezo-electric element, means associating it with said circuit to enable said discharge current to impulsively excite said element at an impulse frequency which is a subharmonic of its natural frequency, and means to cause the application of the electromotive forces piezo-electrically developed by said element to control the timing of the current discharges traversing said discharge device.

6. In combination, a condenser, a charging source therefor, a piezo-electric crystal in voltage transfer relation to said condenser, and a two-electrode gas filled tube in voltage transfer relation to said crystal, whereby said crystal is periodically excited by said condenser and periodically impresses a breakdown potential on said tube to the charge and discharge of said condenser at a frequency which is a sub-multiple of the natural frequency of said piezo-electric crystal.

7. A frequency divider comprising a condenser, a battery and resistance in series to constitute a charging source for said condenser, a two-element gas filled tube, and piezo-electric crystal connected in parallel with each other, and with said condenser.

8. A sub-harmonic frequency producer comprising a condenser, a battery and resistance in series therewith, to supply a charge to said condenser, a two-electrode gas filled tube, and piezo-electric crystal in parallel with each other and with said condenser whereby said condenser is caused to charge and discharge at a frequency which is a sub-multiple of the natural frequency of the piezo-electric crystal.

WARREN A. MARRISON.